(12) United States Patent
Chou et al.

(10) Patent No.: US 8,351,223 B2
(45) Date of Patent: Jan. 8, 2013

(54) TEMPERATURE COMPENSATION IN OUTPUT FEEDBACK OF A FLYBACK POWER CONVERTER

(75) Inventors: Ke-Chih Chou, Zhonghe (TW); Pei-Lun Huang, Zhubei (TW)

(73) Assignee: Richpower Microelectronics Corporation, Grand Cayman (KY)

( * ) Notice: Subject to any disclaimer, the term of this patent is extended or adjusted under 35 U.S.C. 154(b) by 249 days.

(21) Appl. No.: 12/839,002

(22) Filed: Jul. 19, 2010

(65) Prior Publication Data
US 2011/0018609 A1 Jan. 27, 2011

(30) Foreign Application Priority Data
Jul. 22, 2009 (TW) .............................. 98124743 A

(51) Int. Cl.
*H02M 3/335* (2006.01)
(52) U.S. Cl. ................... 363/21.12; 363/20; 363/21.01; 363/21.15; 363/21.17; 363/21.18; 323/902; 323/907
(58) Field of Classification Search .................... 363/20, 363/21.01, 21.12, 21.15, 21.17, 21.18, 902, 363/907; 323/902, 907
See application file for complete search history.

(56) References Cited

U.S. PATENT DOCUMENTS

| | | | | |
|---|---|---|---|---|
| 4,749,889 A | * | 6/1988 | Lagoni et al. | 327/513 |
| 4,847,547 A | * | 7/1989 | Eng, Jr. | 320/153 |
| 5,515,263 A | * | 5/1996 | Otake et al. | 363/97 |
| 7,535,735 B2 | * | 5/2009 | Cuadra et al. | 363/21.15 |
| 2003/0021129 A1 | * | 1/2003 | Balakrishnan et al. | 363/21.01 |

* cited by examiner

*Primary Examiner* — Bao Q Vu
(74) *Attorney, Agent, or Firm* — Rosenberg, Klein & Lee

(57) ABSTRACT

A secondary circuit of a flyback power converter has a resistor network to monitor the output current of the flyback power converter, so as to generate a voltage to apply to a base of a bipolar junction transistor to thereby provide a collector signal for output feedback. The resistor network has a temperature-dependent resistance to compensate the temperature dependence of the base-emitter voltage imparted to the output current and thereby stable the output current.

1 Claim, 2 Drawing Sheets

TEMPERATURE COMPENSATION IN OUTPUT FEEDBACK OF A FLYBACK POWER CONVERTER

FIELD OF THE INVENTION

The present invention is related to power converters and, more particularly, to a circuit and method for temperature compensation in a secondary circuit of a flyback power converter.

BACKGROUND OF THE INVENTION

A bipolar junction transistor (BJT) typically has a base-emitter voltage ($V_{BE}$) of 0.7V. However, as ambient temperature rises, $V_{BE}$ will decrease and thus may lead to system instability. Therefore, BJTs can only be used in a system capable of withstanding variation over a wide range and are avoided in certain circuits when designing a system where stable current is desired. For instance, if a BJT is used to reflect the output current of a flyback power converter to generate an output feedback, temperature variation may cause the output current to exceed a range set forth in the specification. While a switch-mode structure can be used to provide output current control and thereby enable a stable output current, the switch-mode structure is disadvantaged by a large number of components, a complicated and hard-to-control circuit, and high production costs. Therefore, the present invention provides a feedback control circuit and method with temperature compensation implemented by a BJT structure.

SUMMARY OF THE INVENTION

An object of the present invention is to provide a circuit and method for temperature compensation in a secondary circuit of a flyback power converter.

According to the present invention, a flyback power converter includes a capacitor connected between an output end and a ground end to supply an output current, and a transformer having a secondary coil to provide a secondary current for charging the capacitor. The flyback power converter has a secondary circuit which has a resistor network connected in a path of the output current to generate a voltage according to the output current, and a BJT having a base connected to the resistor network to receive the voltage and providing a collector signal for output feedback. The resistor network has a resistance varying with temperature to compensate for the temperature effect of the base-emitter voltage of the BJT on the output current.

According to the present invention, a method for stabilizing an output current of a flyback power converter includes generating a voltage by the output current flowing through a resistor network, and applying the voltage to a base of a BJT to provide a collector signal for output feedback. The resistor network has a resistance varying with temperature to compensate for the temperature effect of the base-emitter voltage of the BJT on the output current.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
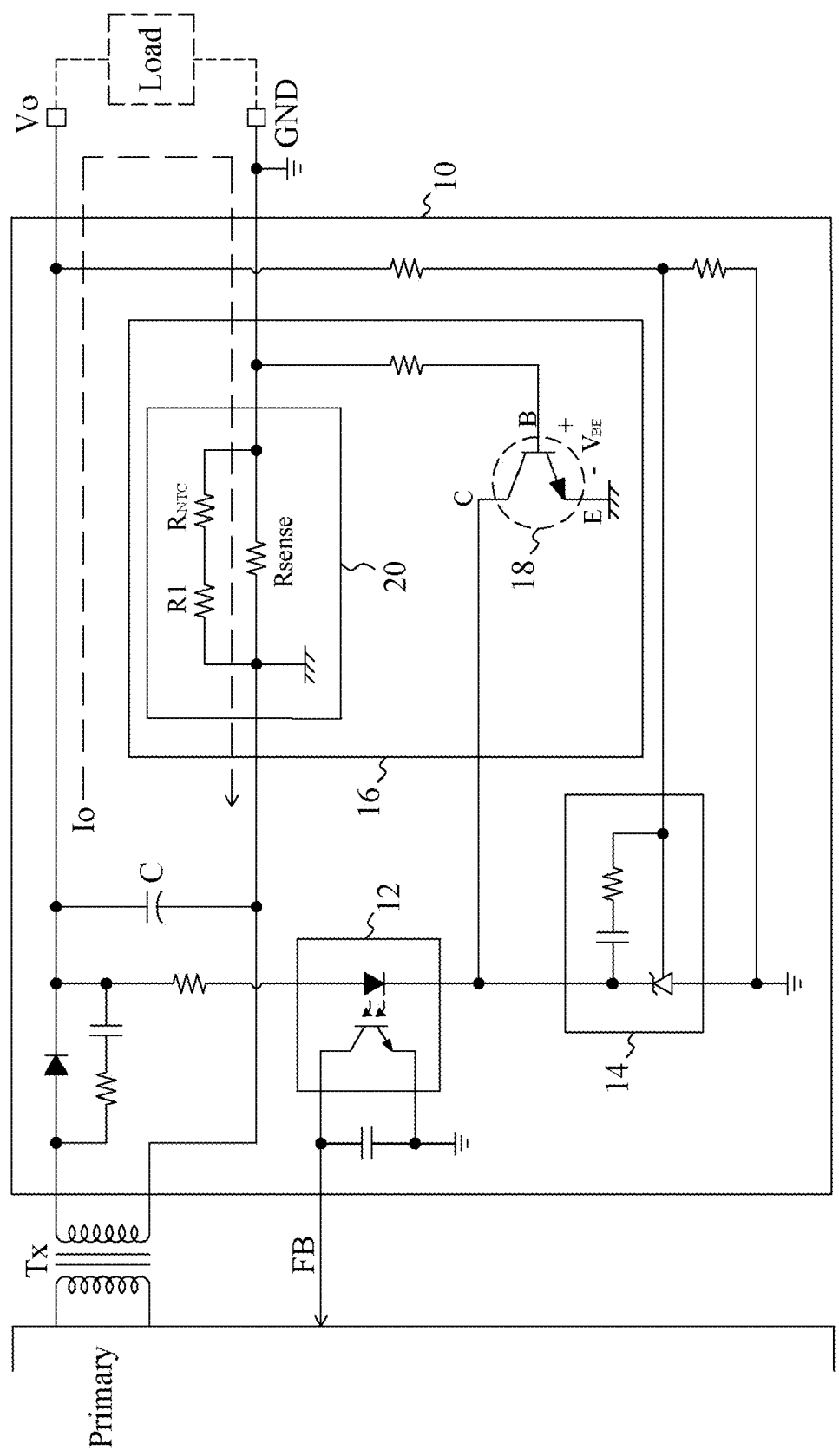
FIG. 1 is a circuit diagram of an embodiment according to the present invention.

FIG. 1 is a circuit diagram of an embodiment according to the present invention, in which block 10 is the secondary circuit of a flyback power converter. The primary circuit of the flyback power converter includes a controller for switching a power switch to control a primary current of a transformer Tx to generate a secondary current for charging a capacitor C and thereby supplying a current Io for load. Output feedback is provided by an optical coupler 12 whose bias point is set by a shunt regulator 14. A constant current circuit 16 includes a current sense resistor Rsense connected between a ground end GND of the flyback power converter and the secondary coil of the transformer Tx to generate a voltage to be applied to a base B of a BJT 18. The BJT 18 has a collector connected to the optical coupler 12 to provide a collector signal thereto, to adjust the bias point of the optical coupler 12. In order to compensate for temperature-dependent variation of the base-emitter voltage $V_{BE}$ of the BJT 18, a resistor R1 and a thermistor $R_{NTC}$ are connected in series to each other and then connected in parallel to the current sense resistor Rsense to constitute a resistor network 20 having the equivalent resistance $$R_{TOTAL}=(R1+R_{NTC})/Rsense, \quad [\text{Eq-1}]$$

and thereby $$V_{BE}=Io \times R_{TOTAL}. \quad [\text{Eq-2}]$$

The thermistor $R_{NTC}$ has a negative temperature coefficient and thus, as ambient temperature rises, the voltage $V_{BE}$ falls down, but since the resistance $R_{TOTAL}$ decreases with the resistance of $R_{NTC}$, the current $$Io=V_{BE} \div R_{TOTAL} \quad [\text{Eq-3}]$$

remains stable. In other words, when $V_{BE}$ varies with temperature, $R_{TOTAL}$ varies accordingly and thereby compensates for the $V_{BE}$-caused variation of the output current Io.

When ambient temperature varies, the resistance of the thermistor $R_{NTC}$ decreases fast. Therefore, in order to achieve fairly linear compensation and overcompensation, the resistor R1 is added to this embodiment and connected in series to the thermistor $R_{NTC}$, before the resistor R1 and the thermistor $R_{NTC}$ are connected in parallel to the resistor Rsense. In other embodiments, the resistor network 20 may be so configured that the thermistor $R_{NTC}$ is connected in series to the current sense resistor Rsense or otherwise arranged, for the equivalent resistance $R_{TOTAL}$ to be negatively correlated to temperature, thus compensating for the negative correlation between the voltage $V_{BE}$ and temperature.

Figure 2:
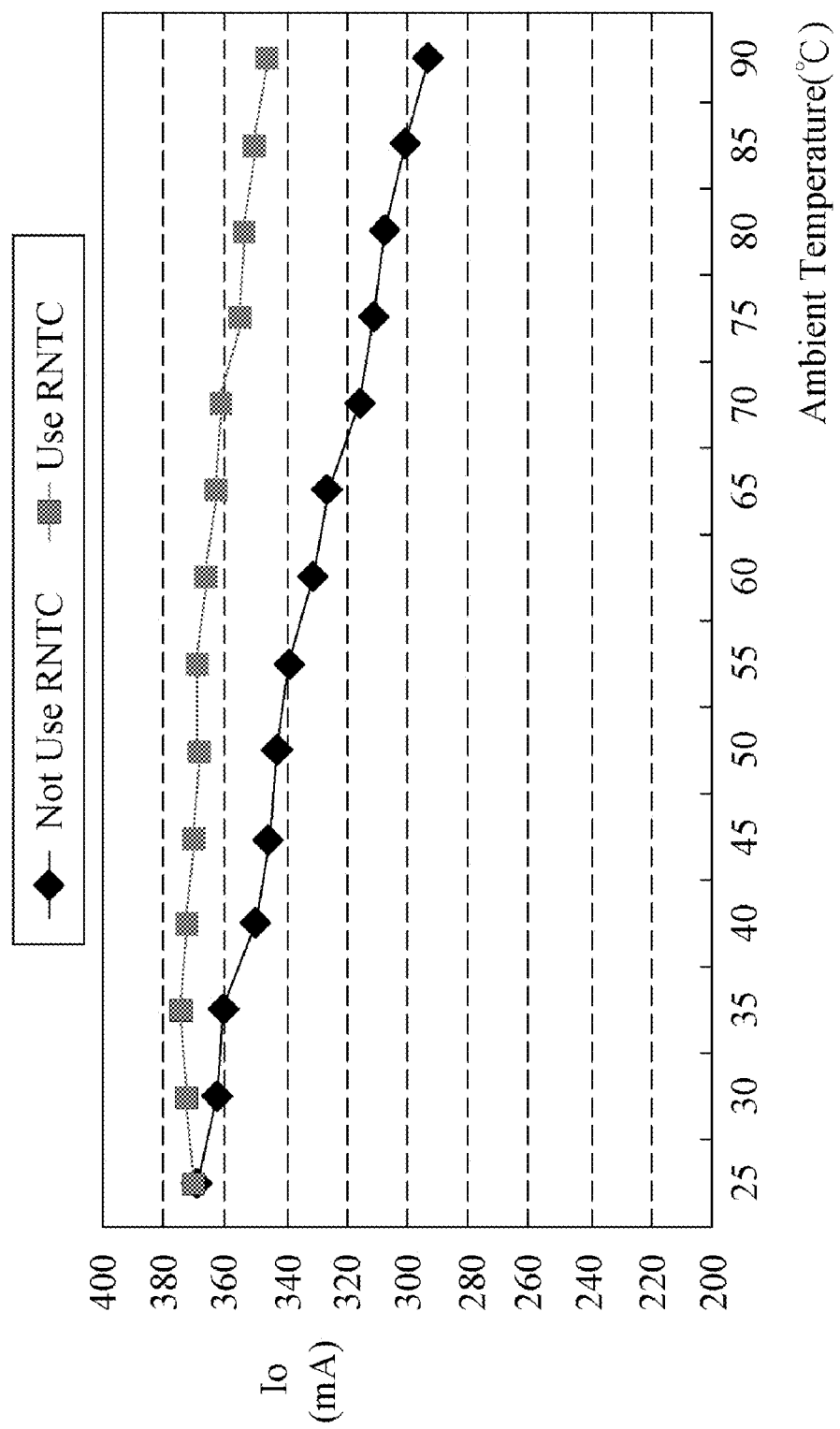
FIG. 2 is a plot showing the relationships between the output current and ambient temperature with and without temperature compensation.

Table 1 shows experimental results with and without temperature compensation, and FIG. 2 is a plot based on the experimental results and showing the relationships between the output current Io and temperature. At room temperature (25° C.), the resistor Rsense has a resistance of 2Ω, the resistor R1 is set at 4.3Ω, and the thermistor $R_{NTC}$ is set at 10Ω. As shown clearly by the data of Table 1 and the curves of FIG. 2, the output current Io is more stable when the thermistor $R_{NTC}$ is used to provide temperature compensation. For example, when the operating temperature is 90° C., the output current Io obtained without $R_{NTC}$ is approximately 20.3% lower than that obtained under standard conditions; on the other hand, the output current Io obtained with $R_{NTC}$ is only 6.5% lower than that obtained under standard conditions, i.e., the approximately 20% drop-down of the output current Io is raised by nearly 14%.

TABLE 1

|  | $V_{BE}$ | $R_{TOTAL}$ | Output Current Io | |
|---|---|---|---|---|
|  |  |  | Without $R_{NTC}$ | With $R_{NTC}$ |
| 30° C. | 0.650 V | 1.738 Ω | 369 mA | 370 mA |
| 40° C. | 0.637 V | 1.699 Ω | 350 mA | 374 mA |
| 50° C. | 0.610 V | 1.646 Ω | 343 mA | 368 mA |
| 60° C. | 0.585 V | 1.603 Ω | 331 mA | 366 mA |
| 70° C. | 0.560 V | 1.555 Ω | 316 mA | 361 mA |
| 80° C. | 0.538 V | 1.512 Ω | 307 mA | 353 mA |
| 90° C. | 0.516 V | 1.480 Ω | 294 mA | 346 mA |

The temperature compensation circuit and method according to the present invention allow a BJT structure whose output current may otherwise vary over a wide range to provide stable constant current. After calculating the compensation abilities precisely, the disclosed circuit and method can be used to replace switch-mode structures which require complex control and high costs.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A secondary circuit of a flyback power converter including a capacitor connected between an output end and a ground end to supply an output current, and a secondary coil of a transformer to provide a secondary current for charging the capacitor, the secondary circuit comprising:
   a resistor network connected in a path of the output current to generate a voltage according to the output current, the resistor network comprising:
   a current sense resistor connected between the ground end and the capacitor;
   a resistor and a thermistor connected in series to each other and connected in parallel to the current sense resistor; and
   a bipolar junction transistor having a base connected to the resistor network to receive the voltage and providing a collector signal for output feedback;
   wherein the resistor network has a resistance varying with temperature to compensate for a temperature effect of a base-emitter voltage of the bipolar junction transistor on the output current.

* * * * *